(12) United States Patent
Tanaka

(10) Patent No.: US 7,466,928 B2
(45) Date of Patent: Dec. 16, 2008

(54) OPTICAL RECEIVER WITH DYNAMIC GAIN AND BANDWIDTH

(75) Inventor: Keiji Tanaka, Kanagawa (JP)

(73) Assignee: Sumitomo Electric Industries, Ltd., Osaka (JP)

(*) Notice: Subject to any disclaimer, the term of this patent is extended or adjusted under 35 U.S.C. 154(b) by 413 days.

(21) Appl. No.: 11/187,436

(22) Filed: Jul. 22, 2005

(65) Prior Publication Data
US 2006/0018669 A1    Jan. 26, 2006

(30) Foreign Application Priority Data
Jul. 23, 2004   (JP)   ............... 2004-216375

(51) Int. Cl.
*H04B 10/06* (2006.01)

(52) U.S. Cl. .................. 398/202; 398/208; 398/209

(58) Field of Classification Search ................ 398/202, 398/203, 208, 209, 213
See application file for complete search history.

(56) References Cited

U.S. PATENT DOCUMENTS

| 5,163,063 | A | * | 11/1992 | Yoshikawa et al. ...... 372/38.02 |
| 6,624,918 | B1 | | 9/2003 | French et al. |
| 6,862,322 | B1 | * | 3/2005 | Ewen et al. ................ 375/316 |
| 2005/0281565 | A1 | * | 12/2005 | Duanmu et al. ............. 398/214 |

FOREIGN PATENT DOCUMENTS

JP    2003-244075    8/2003

* cited by examiner

*Primary Examiner*—Dalzid Singh
(74) *Attorney, Agent, or Firm*—Venable LLP; Michael A. Sartori; Kyle D. Petaja

(57) ABSTRACT

The present invention provides an optical receiver applicable to various transmission rates. The optical receiver of the invention includes a main amplifier and a switching unit. The main amplifier amplifies a voltage signal output from the preamplifier, which converts the photocurrent to the voltage signal. The switching unit is inserted between the preamplifier and the main amplifier to vary the input impedance $R_{IN}$ of the main amplifier depending on the transmission rate.

6 Claims, 5 Drawing Sheets

OPTICAL RECEIVER WITH DYNAMIC GAIN AND BANDWIDTH

BACKGROUND OF THE INVENTION

1. Field of the Invention

The present invention relates to an optical receiver.

2. Related Prior Art

Various optical receivers for the optical communication have been proposed. For example, the U.S. Pat. No. 6,624,918 has disclosed one type of the optical receiver, in which the optical receiver including the light-receiving device, the preamplifier, and the digital controller has been disclosed. The digital controller in this optical receiver, responding the control signal externally providing thereto, adjusts the bandwidth of the preamplifier through the voltage regulator that supplies the power to the preamplifier. In the practical operation, the controller first presets the bandwidth of the preamplifier. When the bandwidth is narrow, the controller adjusts the voltage regulator to increase the supply voltage to the preamplifier, which shifts the 3 dB cut-off frequency of the preamplifier to the higher frequency side. On the other hand, when the preset bandwidth is unnecessary wide, the controller adjusts the voltage regulator to decrease the supply voltage to the preamplifier.

Japanese Patent Application published as 2003-244075 has disclosed another optical receiver with the bandwidth thereof dynamically optimized. This optical receiver includes a trans-impedance amplifier and a bandwidth adjuster connected to the trans-impedance amplifier as the feedback resistor thereof. The bandwidth adjuster has a PIN diode, the bias current of which is controlled by the control signal to vary the dynamic resistance thereof Accordingly, the trans-impedance including the PIN diode varies depending on the transmission rate to optimize the bandwidth of the trans-impedance amplifier. The control signal for the PIN diode is provided from the external CPU. The CPU may decide the transmission rate by extracting the clock involved within the data signal, and output the control signal to the PIN diode depending on thus detected transmission rate.

Typical receiving optical subassembly, which is often called as a ROSA, installs a preamplifier within the common package in addition to the light-receiving device when the transmission rate exceeds 1 Gb/s (gigabit per second). The output buffer of the preamplifier often has a CML (current mode logic) configuration, and a limiting amplifier or occasionally a main amplifier is placed in the down side of the preamplifier. For such high speed transmission rate over 1 Gb/s, the input impedance of the limiting amplifier, or that of the main amplifier must be identical with the transmission impedance of the line connected between the preamplifier and the main amplifier to eliminate the failure derived from the impedance miss-matched effect. The impedance of the transmission line is typically 50 ohm, when the line is a differential line, then the impedance thereof is set 100 ohm.

On the other hand, for the low transmission rate around 100 MHz, to shorten the transmission line may eliminate the impedance miss-matching effect. Moreover, when the input impedance of the down side amplifier is kept low, as for the high transmission rate, the total gain of the optical receiver becomes insufficient. A coupling capacitor is often inserted between the preamplifier and the downside amplifier to cut the DC level. This coupling capacitor constitutes a low cut filter together with the input impedance of the downside amplifier. When the input impedance is rigid and optimized for the high transmission rate, the low cut-off frequency required for the low transmission rate can not be obtained.

SUMMARY OF THE INVENTION

Therefore, one object of the present invention is to provide an optical receiver applicable to wide transmission rates in flexible.

An optical receiver according to the present invention comprises a preamplifier, a main amplifier, a transmission line, and a switching unit. The preamplifier converts a photocurrent generated by a light-receiving device in accordance with an optical signal to a voltage signal. The main amplifier amplifies this voltage signal and outputs thus amplified signal to the outside of the optical receiver. The main amplifier has input impedance that is regarded as a load for the preamplifier. The transmission line with the transmission impedance connects the preamplifier to the main amplifier. The switching unit, which is configured between the transmission line and the ground, is connected in parallel to the input impedance of the main amplifier to vary the equivalent input impedance of the main amplifier. Consequently, the load for the preamplifier is varied and the equivalent impedance of the main amplifier may be matched to the impedance of the transmission line.

The switching unit may include a plurality of switches. Each switch includes a switch device and a resistor connected in serial to the switch device. The switch device may be a field effect transistor SET), the resistor being connected to one of a drain electrode or a source electrode of the FET. The FET and the resistor serially connected thereto may be configured between the transmission line and the ground. Accordingly, only the resistor connected to the switch device turned on by the switching signal is configured in parallel to the input impedance of the main amplifier so that the load resistance viewed from the preamplifier may be dynamically varied.

The optical receive may further include a processing unit to output a plurality of switching signals to each switch to control the turn on the turn off thereof. The switching signals may be an n-bit digital signals, each bit corresponding to individual switches.

The preamplifier may configure a differential output to output a complimentary signal with a positive phase and a negative phase, the main amplifier may configure a differential input to receive the complementary signal and a differential output, and the transmission line may have a pair of transmission lines, one of which transmits the positive phase signal and the other of which transmits the negative phase signal. The input impedance of the main amplifier is configured between two inputs and the switching unit is configured between these two transmission lines. Therefore, by varying the impedance of the switching unit, the equivalent impedance of the main amplifier, which is the load impedance viewed from the preamplifier, may be varied to coincide with the transmission impedance of the transmission line.

Each switches involved in the switching unit may comprise a switch device and a pair of resistors configured to put the switch device therebetween. The resistance of two resistors may be identical to each other to keep the equilibrium condition for the transmission line.

The transmission line may include a capacitor to cut the DC level of the preamplifier to transmit to the main amplifier. This capacitor may constitute a high-pass filter with the input impedance of the main amplifier such that the gain bandwidth of the optical receiver may be adjusted by varying the impedance of the switching unit.

The main amplifier may further include offset cancellation, which connects the positive phase output to the negative phase input while the negative phase output to the positive phase input of the main amplifier. The offset cancellation may include a feedback resistor to adjust the cancellation amount and a capacitor connected between two outputs of the main amplifier to adjust the cutoff frequency of the offset cancellation.

BRIEF DESCRIPTION OF DRAWINGS

from FIG. 4A to FIG. 4D show transmission characteristic of the second stage for the input resistance of 100 ohm and 2000 ohm, respectively.

DESCRIPTION OF PREFERRED EMBODIMENTS

The present invention may be easily understood by considering drawings, which are disclosed as an exemplary, and the specification below. Next, embodiments of the present invention will be described as referring to accompanying drawings. If possible, the same numerals or symbols will refer to the same elements without overlapping explanations.

Figure 1:
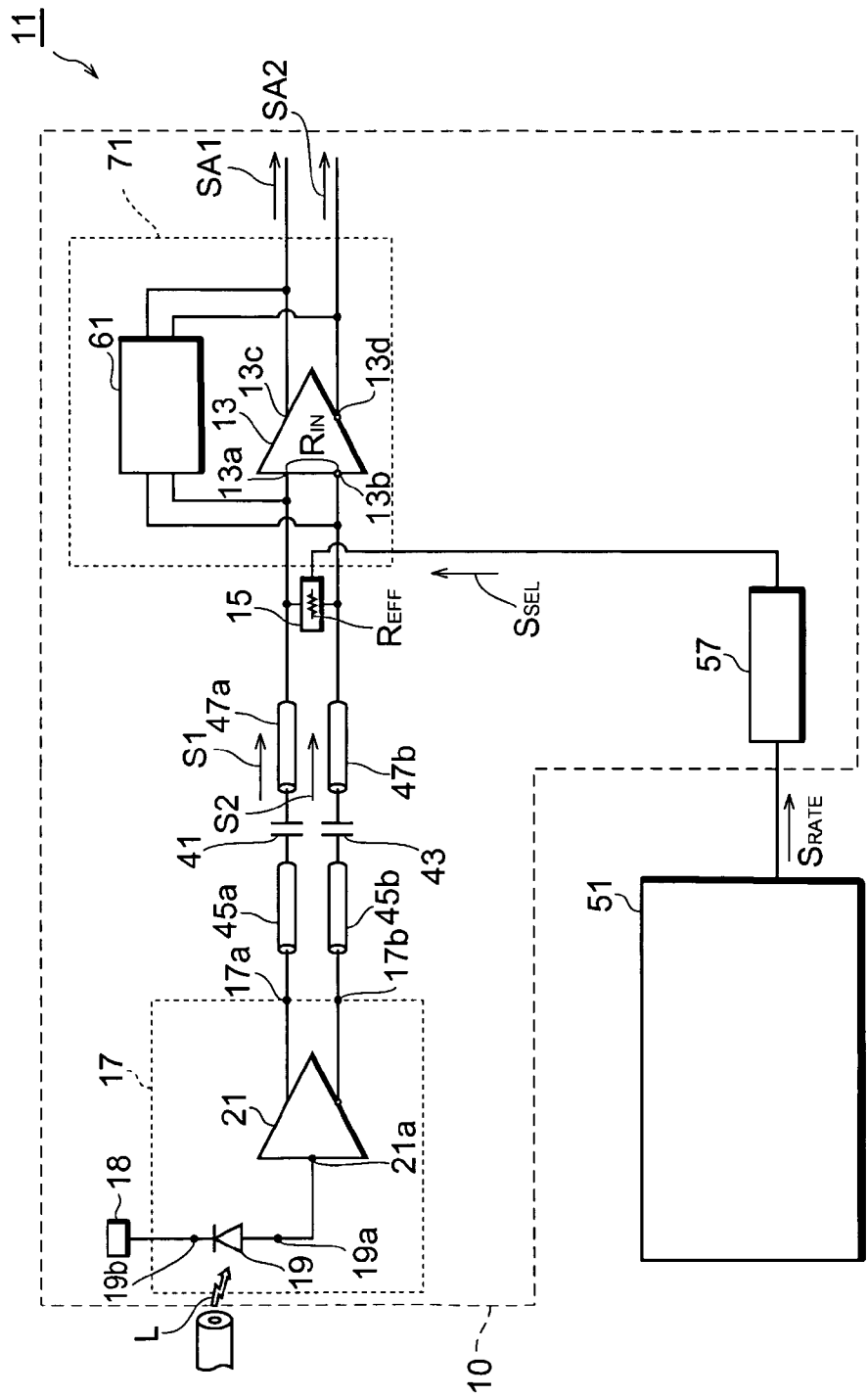
FIG. 1 is a block diagram of the optical receiver according to the present invention.

FIG. 1 is a block diagram of an optical receiver according to the present invention. The optical receiver 11 comprises a first stage 17, a second stage 71, a switching unit 15, and a processing unit 57. The first stage 17 includes a semiconductor light-receiving device 19, such as photodiode, and a preamplifier 21. The second stage 71 includes a main amplifier 13 and an offset cancellation 61.

The light-receiving device 19, biased by the power supply 18 connected to the cathode 19b of the device 19, converts the optical signal L into the photocurrent, which is output from the anode 19a thereof. The preamplifier 21 receives the photocurrent by the input terminal 21a thereof and converts the current signal into a differential signal. The differential signal is output from the output terminals 17a and 17b of the first stage 17. The differential signal has two signals with substantially same magnitude but the phases thereof being complementary to each other.

The differential signal is transmitted on the transmission lines, 45a, 45b, 47a, and 47b to reach the second stage. On the way of the transmission lines, coupling capacitors, 41 and 43, are inserted to cut the DC level of the preamplifier 21, and determine the bandwidth of the optical receiver 11 in the low frequency side combined with the equivalent input impedance of the main amplifier 13. Therefore, the capacitance of these capacitors 41 and 43, are selected to make the cutoff frequency enough low with respect to the signal under consideration. The capacitance of 0.1 micro-farad (uF) to 0.01 uF typically secures the cutoff frequency enough low. Between the transmission lines, the switching unit 15 is bridged. Details and functions of this switching unit 15 will be explained later. The transmission lines, 45a, 45b, 47a and 47b, may be a micro-strip line.

The main amplifier 13 in the second stage 71 provides two input terminals, 13a and 13b, each connected to the outputs, 17a and 17b, of the first stage 17 through the transmission lines, 45a and 47a for the positive phase signal while through the transmission lines, 45b and 47b for the negative phase signal, respectively. The main amplifier 13 also provides output terminals, 13c and 13d, for the positive phase signal SA1 and the negative phase signal SA2, respectively. The complementary signals, SA1 and SA2, are output from the optical receiver 11. Between the input terminals, 13a and 13b, and the output terminals, 13c and 13d, are provides with the offset cancellation 61, with a configuration of the alternative connection. That is, the positive phase output 13c is lead to the negative phase input 13b, while the negative phase output 13d is led to the positive phase input 13a. Thus, the offset appeared in the outputs, SA1 and SA2, are substantially cancelled.

The optical receiver 11 of the present invention further provides the switching unit 15 in front of the main amplifier 13, i.e., between the inputs, 13a and 13b, of the main amplifier 13. Therefore, the equivalent input impedance of the main amplifier 13 viewed from the output of the first stage 17 becomes the parallel impedance of the input impedance $R_{IN}$ of the main amplifier 13 and the impedance $R_{EFF}$ of the switching unit 15. The impedance $R_{REF}$ of the switching unit 15 may be varied by the switching signal $S_{SEL}$ provided from the processing unit 57. This switching signal $S_{SEL}$ may be an n-bit digital signal.

Figure 2:
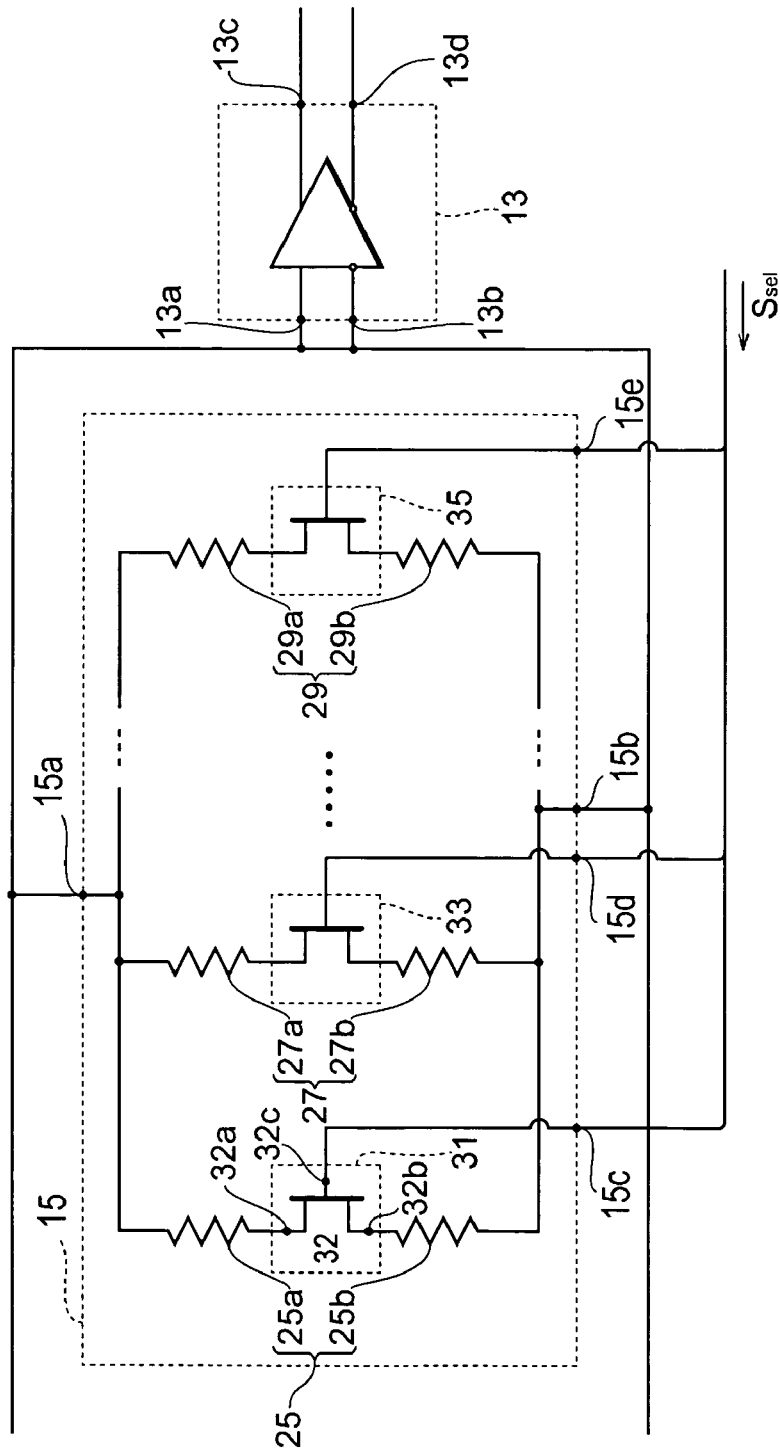
FIG. 2 is a circuit diagram showing one example of the switching section of the optical receiver.

FIG. 2 is a circuit diagram showing one example of the switching unit 15. This switching unit 15 has a first and second terminals, 15a and 15b, a plurality of resistors, 25 to 29, and a plurality of switches, 31 to 35. The first terminal 15a is connected to the input 13a for the positive phase signal of the main amplifier 13, while the second terminal 15b is connected to the input 13b for the negative phase signal of the main amplifier. A combination of resistors, 25 to 29, and switches, 31 to 35, are put between the first and second terminals, 15a and 15b. That is, a combination of the switch 31 and two resistors, 25a and 25b, putting the switch 31 therebetween are connected between the first and second terminals, 15a and 15b. The other combinations of the switch 33 and the resistor 27, and the switch 35 and the resistor 29, are also put between two terminals, 15a and 15b. In the present embodiment, the switch may be an FET switch with one current electrode, the source or the drain thereof, is connected to the one of resistors, 25a or 25b, the other current electrode is connected to the other resistors, 25b or 25a, and the gate of the FET is led to the one of the switching signal $S_{SEL}$ via the first control input 15c. Similarly, the other switches, 33 and 35, are also connected to the switching signal $S_{SEL}$ via the control inputs, 15c and 15d, respectively. The resistance of two resistors, 25a and 25b, are preferable to equal to each other to balance two signal lines of the positive phase and negative phase signals.

According to this switching unit 15, the input impedance of the main amplifier 13 viewed from the output of the first stage may be adjusted by selecting the switches, 31 to 33. For example, when only the switch 31 is selected, namely, only the FET switch 32 is turned on, the equivalent input impedance becomes a resistance of the intrinsic impedance $R_{IN}$ of the main amplifier 13 in parallel to the resistor 25. By selecting the pattern of the switching signal $S_{SEL}$, the equivalent input impedance of the main amplifier 13 can be varied by $2^N$ manners, where N is a bit count of the switching signal $S_{SEL}$.

The operation of the optical receiver 11 will be described as referring to FIG. 1 again. The first stage 17 receives the optical signal L to the light-receiving device 19. The optical signal L includes a data to be transmitted and a clock synchronized to the data. The clock means the transmission rate of the data, which may be from few hundred megabit per second to a few gigabit per second. Although not shown explicitly in the figure, the controller 51, by receiving the outputs, SA1 and SA2, from the main amplifier 13, may extract the clock from the output signals, SA1 and SA2, to generate the rate signal $S_{RATE}$. In a modification, the controller may receive the information relating to the clock from the host computer system, and may pass this information to the processing unit 57 as the output $S_{RATE}$ of the controller 51. The processing unit 57, by receiving the rate signal $S_{RATE}$ from the controller 51, generates the switching signal $S_{SEL}$ of the n-bit digital data. The interface between the controller 51 and the processing unit 57 may be serial to transmit the rate signal $S_{RATE}$ by an analog form, or may be digital interface to transmit an n-bit signal. When the optical receiver 11 may have enough lead pins, the controller 51 can directly output the switching signal $S_{SEL}$ by the n-bit digital signal without intervening in the processing unit 57.

By selecting the turning on/off of the switch within the switching unit 15 with the switching signal $S_{SEL}$, the input impedance of the main amplifier 13 viewed from the first stage 17 can be varied, which is equivalently change of the load resistance of the first stage 17, accordingly, the gain of the first stage, too. For example, assuming the differential output impedance of the first stage, i.e., the output impedance of the preamplifier, is 100 ohm, the summed up gain of the first and second stages becomes greater by about 5.6 dB for the case that the input impedance of 2 k ohm compared to the case that the input impedance is 100 ohm.

Figure 3:
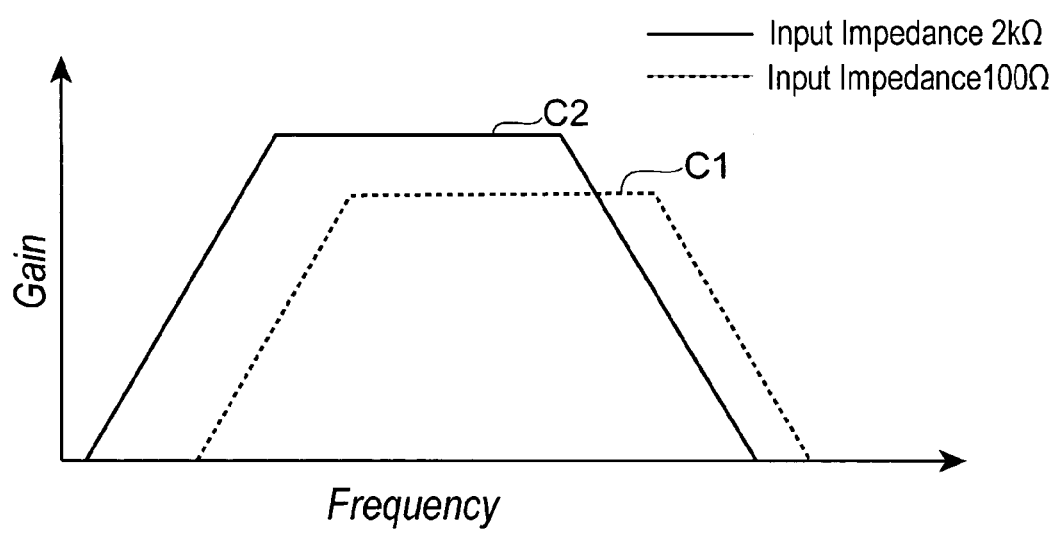
FIG. 3 is a schematic diagram showing the dependence of the gain and the bandwidth on the input resistance.

On the other hand, the greater input impedance means the smaller high cut frequency, the narrower bandwidth, because the equivalent input impedance of the main amplifier 13 makes a high-cut filter combined with the coupling capacitors, 41 and 43, with the product of the resistance and the capacitance thereof giving the cut-off frequency. FIG. 3 shows the bandwidth and the gain characteristics for two types of the input impedance of the main amplifier 13. The dotted line C1 corresponds to the case of the input impedance of 100 ohm, while the solid line C2 corresponds to 2 k ohm.

As shown in FIG. 3, the gain thereof increases by about 5.6 dB as discussed previously, while the low cut-off frequency decreases as increasing the resistance of the input impedance of the main amplifier 13. The product of the input impedance by the capacitance of the coupling capacitor determines the low cut-off frequency. Therefore, when the input impedance increases from 100 ohm to 2 k ohm, the low cut-off frequency lowers by 1/20. When the coupling capacitor is restricted to a small capacitance due to the physical dimensions to be installed within the optical receiver 11, to switch the input impedance may be effective.

The high cut-off frequency also decreases in the case that the input impedance is 2 k ohm. This is due to the parasitic capacitance inherently attributed to the transmission lines, 47a and 47b, and the input terminals, 13a and 13b, of the main amplifier 13. The parasitic capacitance is regarded to connect these transmission lines, 47a and 47b, and the input terminals, 13a and 13b, to the ground, which forms a high-pass filter together with the input impedance of the main amplifier 13. Therefore, when the input impedance increases from 100 ohm to 2 k ohm, the high cut-off frequency decreases accordingly.

From FIG. 4A to FIG. 4D show a bit error characteristic of the optical receiver 11 for two cases of the input impedance of 100 ohm and 2 k ohm. In the figures, the horizontal axis corresponds to the optical input power (dBm), while the vertical axis denotes the bit error ratio. These characteristics are measured under the SONET-SDH standards, for FIGS. 4A to 4C, and under the Gigabit Ether, the transmission speed of which is 1.25 Gb/s.

Figure 4B:
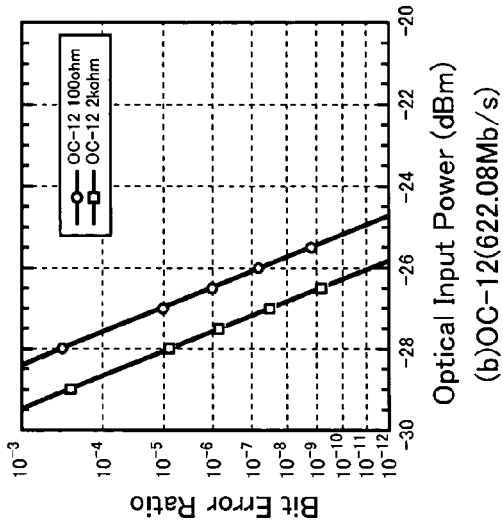
Figure 4D:
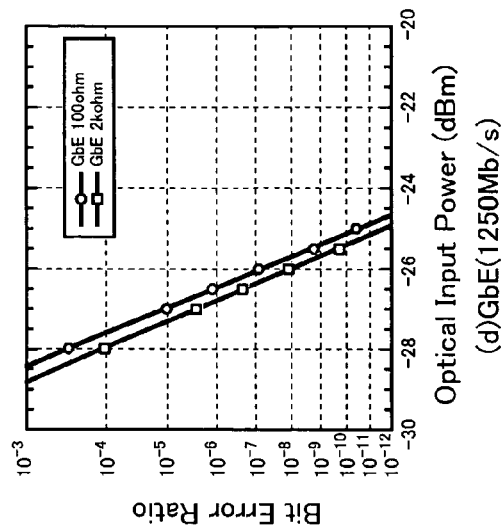
Figure 4A:
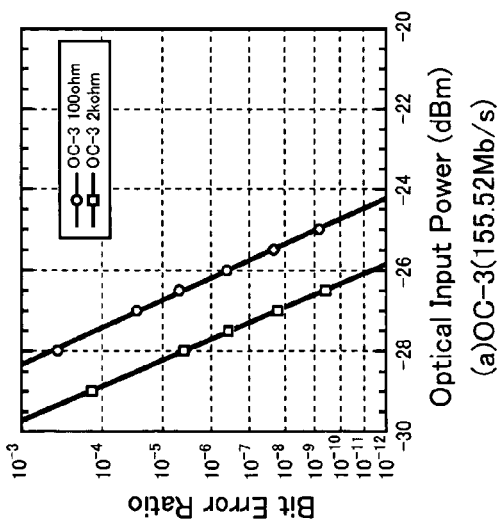
Figure 4C:
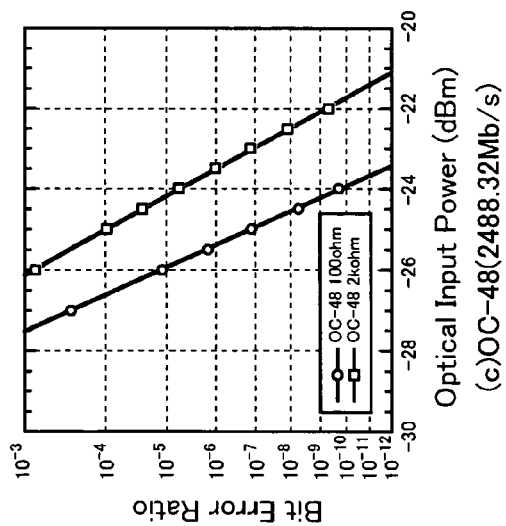

In the case of the OC-48 standard shown in FIG. 4C, the bit error ratio degrades due to the impedance mismatching when the input impedance is 2 k ohm. On the other hand, for the OC-3 and the OC-12 standards, the bit error ratio has improved for the input impedance of 2 k ohm. The GbE standard, shown in FIG. 4D, appears independent of the input impedance. Between two standards, the SONET-SDH and the GbE, the measurement for obtaining the bit error ratio is different to each other. The results appeared in FIGS. 4A to 4D may reflect this difference.

Figure 5:
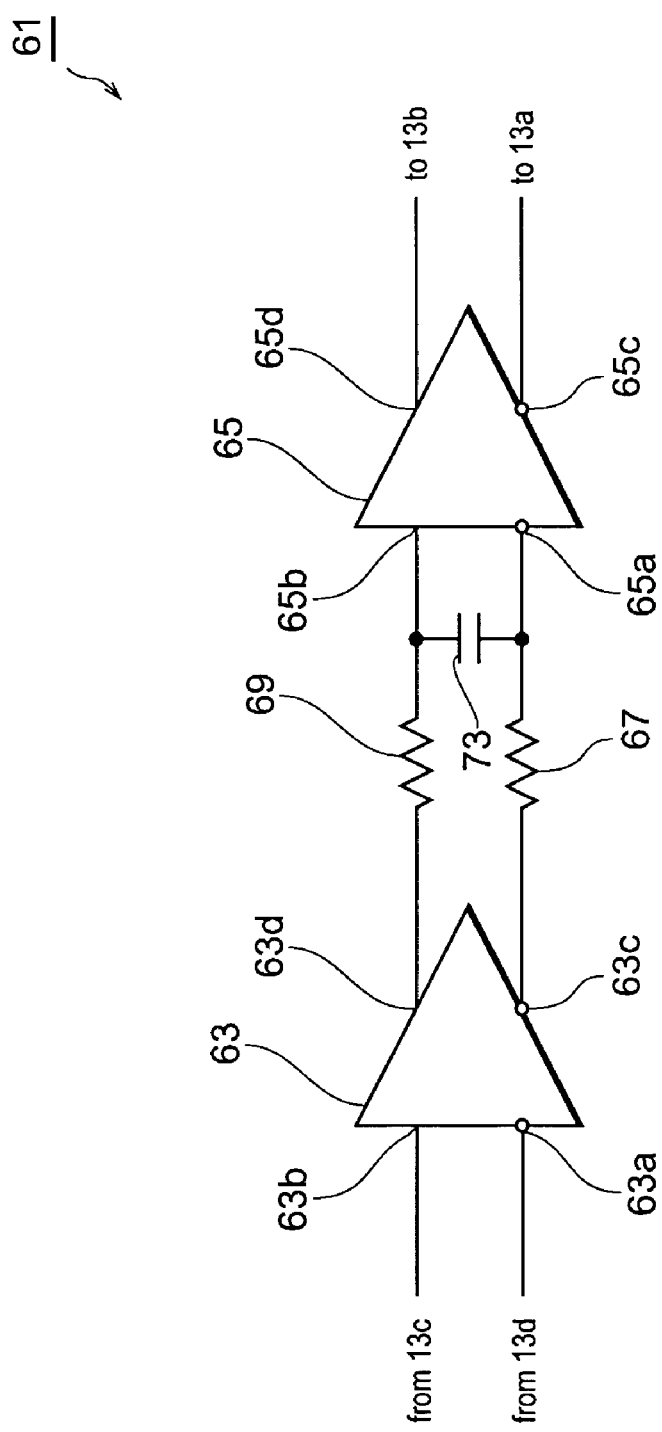
FIG. 5 is a schematic diagram of the present optical receiver.

The optical receiver 11 may includes the offset cancellation 61 for the main amplifier 13 of the second stage 71 to cancel the DC offset appeared in the input terminals, 13a and 13b, thereof FIG. 5 illustrates one example of the offset cancellation 61. The offset cancellation 61 includes two differential amplifiers, 63 and 65, and two feedback resistors, 69 and 67. Each differential amplifier provides the differential inputs, 63a and 63b for the first amplifier, and 65a and 65b for the second amplifier, and the differential output, 63d and 63c for the first amplifier, and 65c and 65d for the second amplifier.

The positive phase output 13c of the main amplifier 13 is led to the positive phase input of the first amplifier, while the negative phase output 13d of the main amplifier 13 is led to the negative phase input. The positive phase output of the first amplifier is led to the positive phase input of the second amplifier via the first resistor 69, while the negative phase output of the first amplifier is led to the negative phase input of the second amplifier via the second resistor 67. However, the positive phase output of the second amplifier 65d is led to the negative phase input 13b of the main amplifier, and the negative phase output 65c of the second amplifier is led to the positive phase input 13a of the main amplifier 13. Thus, the main amplifier 13 is fed back in negative by the offset cancellation 61. The feedback amount is determined by the feedback resistors, 67 and 69, which are typically from 10 k to 100 k ohm. Between the feedback resistors, 69 and 67, is connected with a capacitor 73, which constitutes the low pass filter together with the feedback resistors, 67 and 69, and is typically from 0.01 micro-farad (uF) to 1 uF. Thus, the cancellation 61 only feedbacks the low frequency component, or the DC component involved in the outputs, SA1 and SA2, of the main amplifier 13 to the input thereof, accordingly, only the DC offset of the main amplifier 13 may be cancelled.

According to the present invention, since the optical receiver has the main amplifier with the equivalent input impedance being capable of optionally selecting depending on the transmission rate, for example from a hundred megabit a second to a gigabit per second. Consequently, the optimal gain and bandwidth may be realizable for the various signal frequencies.

The invention is explained by referring to the preferable embodiments thereof However, the present invention is not restricted to those embodiments, and may be varied in the configuration and the diagram without departing from the spirit of the invention. For example, the switching unit provides the field effect transistor for the switching device, but the other devices such as bipolar transistors may be used for the switching device. Further, the specification and the drawings concentrate on the differential configuration of the preamplifier, the main amplifier, the switching unit, and the offset cancellation. However, the function of the present invention may apply to the single mode configuration. In such case, the switching unit is connected between the transmission line and the ground to vary the equivalent input impedance of the main amplifier. The offset cancellation may be unnecessary.

What is claimed is:

1. An optical receiver for receiving an optical signal with a transmission rate by a semiconductor light-receiving device that outputs a photocurrent corresponding to said optical signal, comprising:
   a preamplifier for converting said photocurrent into a differential voltage signal, said preamplifier having a configuration of a differential amplifier to output said differential voltage signal,
   a main amplifier having a configuration of a differential amplifier with two inputs and two outputs for amplifying said differential voltage signal input in said two inputs and outputting from said two outputs, said main amplifier having input impedance between said two inputs,
   a pair of transmission lines to transmit said differential voltage signal output from said preamplifier to said main amplifier;
   a switching unit connected between said pair of transmission lines,
   wherein said transmission lines each include a capacitor to cut a DC level contained in said differential voltage signal output from said preamplifier, and
   wherein said switching unit is connected in parallel to said input impedance of said main amplifier to vary a low-cut frequency of said optical receiver by changing an equivalent input impedance of said main amplifier.

2. The optical receiver according to claim 1,
   wherein said input impedance of said main amplifier is impedance-matched with impedance of said transmission lines by said switching unit.

3. The optical receiver according to claim 1,
   wherein said switching unit includes a plurality of switches each involving a switch device and a pair of resistors connected in serial to said switch device.

4. The optical receiver according to claim 3,
   wherein said switch device is a field effect transistor, and one of said resistors is connected between one of a drain electrode or a source electrode of said field effect transistor and one of said transmission lines and the other of said resistors is connected between the other of said drain electrode or said source electrode of said field effect transistor and the other of said transmission lines.

5. The optical receiver according to claim 3,
   further comprising a processing unit to output a plurality of switching signals each provided one of switches to turn on said switch device,
   wherein said resistors connected to said switch device that turns on by said switching signal are connected in parallel to said input impedance of said main amplifier.

6. The optical receiver according to claim 1,
   further comprising an offset cancellation connected between said two outputs and said two inputs of said main amplifier such that a positive phase output of said main amplifier is led to a negative phase input of said main amplifier and a negative phase output of said main amplifier is led to a positive phase input of said main amplifier through said offset cancellation.

* * * * *